United States Patent
Fukuda et al.

(10) Patent No.: US 11,702,074 B2
(45) Date of Patent: Jul. 18, 2023

(54) DRIVING SUPPORT APPARATUS

(71) Applicant: TOYOTA JIDOSHA KABUSHIKI KAISHA, Toyota (JP)

(72) Inventors: Hiroki Fukuda, Shizuoka-ken (JP); Atsushi Tojo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 17/026,795

(22) Filed: Sep. 21, 2020

(65) Prior Publication Data

US 2021/0107481 A1 Apr. 15, 2021

(30) Foreign Application Priority Data

Oct. 11, 2019 (JP) .................. 2019-187820

(51) Int. Cl.
    *B60W 30/14* (2006.01)
    *B60T 7/12* (2006.01)
    *B60K 31/00* (2006.01)

(52) U.S. Cl.
    CPC ............. *B60W 30/146* (2013.01); *B60T 7/12* (2013.01); *B60K 2031/0091* (2013.01); *B60W 2720/106* (2013.01)

(58) Field of Classification Search
    CPC .... B60T 7/12; B60T 7/18; B60T 7/22; B60W 30/143; B60W 30/146; B60W 30/18109; B60W 2720/10; B60W 2720/106; B60W 2050/0008; B60W 2050/0012; B60K 2031/0091
    USPC .......................................................... 701/93
    See application file for complete search history.

(56) References Cited

U.S. PATENT DOCUMENTS

| 11,427,305 B1* | 8/2022 | Wiegman | B64C 29/0025 |
| 2008/0086251 A1* | 4/2008 | Lu | B60T 8/1755 701/70 |
| 2009/0063000 A1* | 3/2009 | Kodama | B60W 30/16 701/75 |
| 2016/0185327 A1* | 6/2016 | Ishida | B60T 8/175 701/74 |
| 2016/0200300 A1* | 7/2016 | Ishida | B60T 8/175 701/83 |
| 2016/0288786 A1* | 10/2016 | Lavoie | B60T 7/20 |
| 2016/0297439 A1* | 10/2016 | Inoue | B60W 10/20 |

(Continued)

FOREIGN PATENT DOCUMENTS

| CA | 2568220 C | * 10/2012 | B60G 17/0195 |
| CA | 2892556 C | * 1/2019 | G05B 19/19 |

(Continued)

*Primary Examiner* — Atul Trivedi
(74) *Attorney, Agent, or Firm* — Sughrue Mion, PLLC

(57) ABSTRACT

A driving support apparatus includes a feedback control system. The feedback control system calculates each operation amount of a brake actuator and a drive actuator so as to match an actual value of a control amount indicating a motion state of the vehicle to a target value. The target value of the control amount is set so as to stop the vehicle to a target stop position. The driving support apparatus sets, when remaining distance from a current position of the vehicle to the target stop position is first distance, a feedback gain of the feedback control system to large value, as compared with the feedback gain set when the remaining distance is second distance which is greater than the first distance.

4 Claims, 8 Drawing Sheets

(56) References Cited

U.S. PATENT DOCUMENTS

| | | | | |
|---|---|---|---|---|
| 2016/0349751 A1* | 12/2016 | Sugimoto | ............. | B60W 10/20 |
| 2017/0106869 A1* | 4/2017 | Lavoie | ...................... | B60T 7/20 |
| 2020/0156639 A1* | 5/2020 | Liu | .................... | B60W 40/105 |
| 2021/0370896 A1* | 12/2021 | Momose | ................. | B60T 8/173 |
| 2022/0063618 A1* | 3/2022 | Yasui | ................... | B60W 40/04 |

FOREIGN PATENT DOCUMENTS

| | | | | | |
|---|---|---|---|---|---|
| CA | 3101582 A1 | * | 2/2020 | .......... | B61L 15/0072 |
| EP | 1967433 A1 | * | 9/2008 | ......... | B60T 8/17552 |
| JP | 8-282330 A | | 10/1996 | | |
| JP | 2000-177428 A | | 6/2000 | | |
| JP | 2008-137442 A | | 6/2008 | | |
| JP | 2013-49389 A | | 3/2013 | | |
| WO | WO-2012014040 A1 | * | 2/2012 | ......... | B60K 31/0058 |

\* cited by examiner

DRIVING SUPPORT APPARATUS

CROSS-REFERENCE TO RELATED APPLICATION

The present application claims priority under 35 U.S.C. § 119 to Japanese Patent Application No. 2019-187820, filed Oct. 11, 2019. The contents of this application are incorporated herein by reference in their entirety.

BACKGROUND

Field

The present disclosure relates to a driving support apparatus for supporting to drive a vehicle.

Background Art

JP2000-177428A discloses a driving support apparatus that performs track following control for making a vehicle travel along a target track. This driving support apparatus first sets a target position of the vehicle relevant to time. Then, the driving support apparatus performs feedback control for vehicle speed so that the state quantity indicating the positional deviation between the target position and the actual traveling position is reduced.

PRIOR-ART DOCUMENT

Patent Document

Summary

The track following control is also available for stop-control to stop the vehicle to a target stop position. Specifically, drawing a target track to the target stop position, a control device drives the vehicle along the target track, and finally, stops the vehicle at the target stop position. As a method for stopping the vehicle accurately to the target stop position, a feedback gain of the feedback control performed in the track following control may be increased. However, when setting the feedback gain so, since the vehicle speed becomes to vibrate at a high frequency, there is a possibility that riding comfort is deteriorated.

An objected of an example in the present disclosure is to achieve both accuracy of arrival at a target stop position and riding comfort in the driving support apparatus.

According to a first aspect of the present disclosure, a driving support apparatus to assist in the operation of a vehicle is provided. The driving support apparatus includes a feedback control system. The feedback control system calculates each operation amount of a brake actuator and a drive actuator so as to match an actual value of a control amount indicating a motion state of the vehicle to a target value. The target value of the control amount is set so as to stop the vehicle to a target stop position. The driving support apparatus, when remaining distance from a current position of the vehicle to the target stop position is first distance, as compared with the case that the remaining distance is second distance which is greater than the first distance, sets a feedback gain of the feedback control system to greater value.

According to a second aspect of the present disclosure, in addition to the first aspect, the driving support apparatus further has the following features: The feedback gain monotonically increases as the remaining distance decreases.

According to a third aspect of the present disclosure, in addition to the second aspect, the driving support apparatus further includes the following features: The feedback gain has an upper limit value.

According to a fourth aspect of the present disclosure, in addition to any one of the first to third aspects, the driving support apparatus further includes the following features. The feedback control system includes at least one of a speed feedback system for feeding back speed of the vehicle and an acceleration feedback system for feeding back acceleration of the vehicle. The feedback gain includes at least one of a speed feedback gain for the speed feedback system and an acceleration feedback gain for the acceleration feedback system.

According to the first aspect, if the remaining distance is relatively small, that is, if the remaining distance is the first distance, the accuracy of arrival at the target stop position is enhanced by relatively enlarging the feedback gain. If the remaining distance is relatively large, that is, if the remaining distance is the second distance, the feedback gain is relatively decreased. Thereby the vibration at high frequencies of the vehicle speed is suppressed so that the deterioration of the riding comfort is suppressed.

According to the second aspect, the accuracy of arrival at the target stop position is gradually improved while suppressing excessive deterioration of the riding comfort.

According to the third aspect, excessive deterioration of the riding comfort is suppressed.

According to the fourth aspect, since at least one of the speed and the acceleration of the vehicle is the variable indicating the motion state of the vehicle, the deterioration of riding comfort is suppressed while increasing the accuracy of arrival at the target stop position.

DESCRIPTION OF EMBODIMENTS

Figure 1:
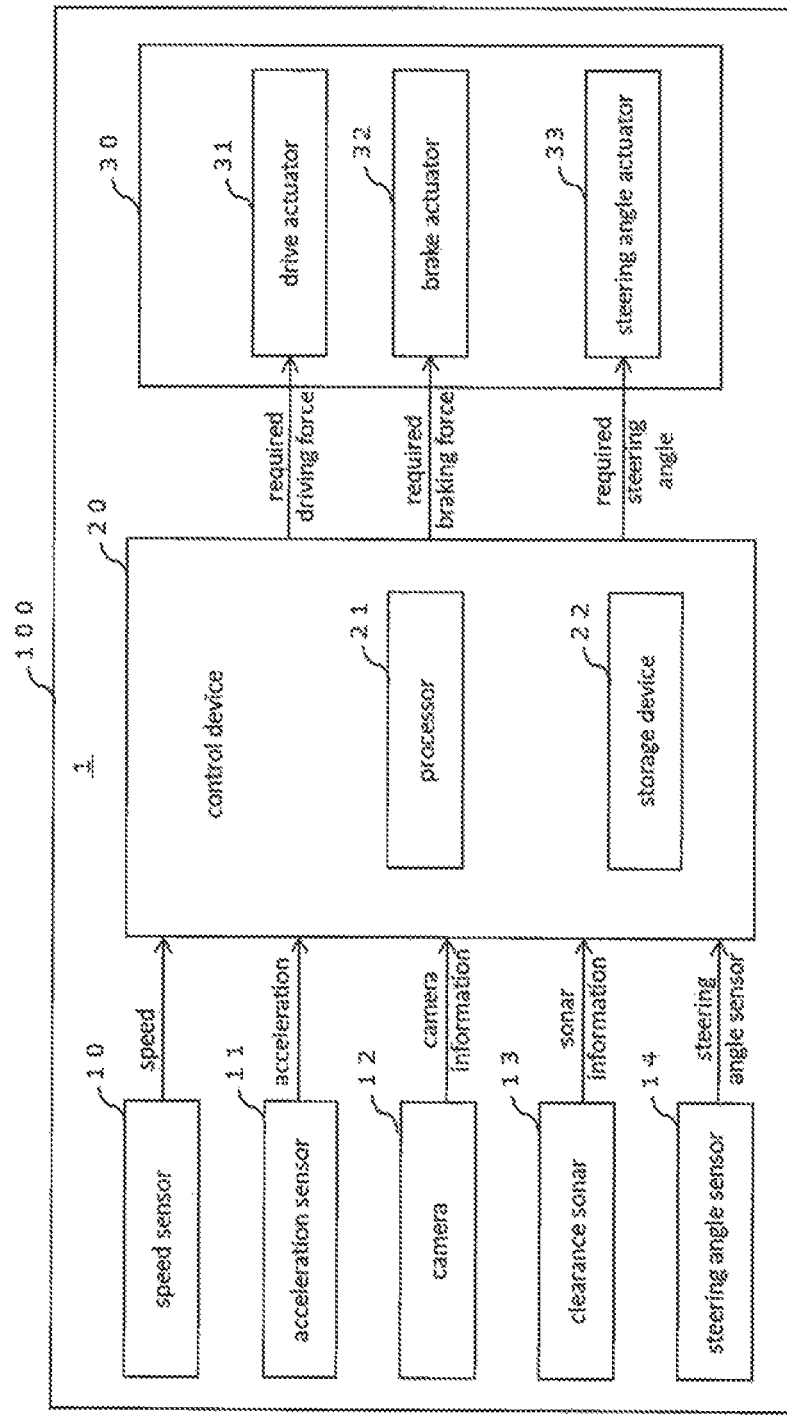
FIG. 1 is a block diagram illustrating a configuration of an example of a driving support apparatus according to an embodiment in the present disclosure.

Hereinafter, specific embodiments in the present disclosure will be described in detail with reference to the drawings. In order to clarify the description, the following description and the drawings are appropriately simplified. In the following description, the same or corresponding elements are denoted by the same reference numerals, and a repetitive description thereof is omitted.

FIG. 1 is a block diagram illustrating a configuration of an example of a driving support apparatus according to an embodiment in the present disclosure. A driving support apparatus 1 is provided in a vehicle 100 capable of automatic driving. The driving support apparatus 1 includes a control device 20 configured with one or more ECUs (Electronic Control Unit). Signals are input to the control device 20 from various sensors, for example, a speed sensor 10, an acceleration sensor 11, a camera 12, a clearance sonar 13, and a steering angle sensor 14. The control device 20 outputs operation signals to the vehicle actuators 30, specifically, the drive actuator 31, the brake actuator 32, and the steering angle actuator 33. The driving support apparatus 10 described herein may be includes only the control device 20. Also, a system including the control device 20, the various sensors 10-14, and the vehicle actuators 30 may be referred to as the driving support apparatus 1.

The speed sensor 10 is a sensor that acquires the speed of the vehicle 100, i.e., vehicle speed. The speed sensor 10 includes a wheel speed sensor (not shown) and an arithmetic unit that processes a signal of the wheel speed sensor to calculate the speed of the vehicle 100. The speed sensor 10 sequentially transmits the speed of the vehicle 100 to the control device 20.

The acceleration sensor 11 is a sensor for acquiring the acceleration of the vehicle 100. The acceleration sensor 11 includes a wheel speed sensor (not shown) and an arithmetic unit that processes a signal of the wheel speed sensor to calculates the acceleration of the vehicle 100. The acceleration sensor 11 sequentially transmits the acceleration of the vehicle 100 to the control device 20.

The camera 12 is an imaging device for acquiring captured image data of the bird's-eye image viewed the vehicle 100 from the vertical upward position. The camera 12 includes cameras located, for example, near a front grill, near a luggage compartment, and near both side mirrors of the vehicle 100. The camera 12 synthesizes the captured image data and acquires the captured image data representing the bird's-eye image of the vehicle 100. Details of the arrangement of the cameras are not shown.

The captured image data includes the relative coordinates of the objects on the captured image relative to the position of the vehicle 100 on the captured image at the time of capture. Since the captured image includes various objects, such as obstacles, compartment lines, parking frames, and the like, the captured image data includes the relative coordinates of those objects relative to the position of the vehicle 100 on the captured image at the time of capture. The camera 12 sequentially transmits the captured image data to the control device 20 as camera information.

The clearance sonar 13 is a sensor which uses sound waves to detect a distance from a position of a plurality of sonars disposed outside the vehicle 100 to an obstacle existing outside the vehicle 100. The clearance sonar 13 sequentially transmits the distance from each sonar to the acquired obstacle to the control device 20 as sonar information.

The steering angle sensor 14 is a sensor which acquires steering angle of the vehicle 100. The steering angle sensor 14 acquires the steering angle of the vehicle 100 based on turning angle and steering angle of the vehicle 100, and sequentially transmits the acquired steering angle to the control device 20.

The drive actuator 31 is an actuator that causes drive wheels of the vehicle 100 to exert driving torque in response to required driving force transmitted from the control device 20. Examples of drive actuators 31 may include powertrains for an engine, a motor, a hybrid system in which an engine and motor are combined, or the like.

The braking actuator 32 is an actuator which generates braking force of wheels of the vehicle 100 in response to the required braking force transmitted from the control device 20. A specific example of the braking actuator 32 is a friction brake provided on four wheels of the vehicle 100.

The steering angle actuator 33 is an actuator which steers a steering wheel of the vehicle 100 in response to required steering angle transmitted from the control device 20. A specific example of the steering angle actuator 33 is an electric steering.

The control device 20 including one or a plurality of the ECUs includes a processor 21 and a storage device 22. The control device 20 realizes various kinds of processing by executing various programs stored in the storage device 22 by the processor 21. Various types of information such as the speed, the acceleration, the camera information, the sonar information, and the steering angle of the vehicle 100 acquired by the aforementioned sensors are used for realization of the various processes. One of the various processes realized by the control device 20 is a track following control for making the vehicle 100 follow along a target track.

In the track following control, the control device 20 sets a target value of the control amount representing the motion state of the vehicle 100 based on the target track to be described later, and calculates operation amount of the actuators 30 of the vehicle 100 so as to match the actual value of the control amount representing the motion state of the vehicle 100 to the target value. The control device 20 calculates required driving force as the operation amount for the drive actuator 31, required braking force as the operation amount for the braking actuator 32, and required steering angle as the operation amount for the steering angle actuator 33. From the control device 20 to the vehicle actuators 30, a signal corresponding to each of the operation amount calculated by the control device 20 is sequentially transmitted.

Figure 2:
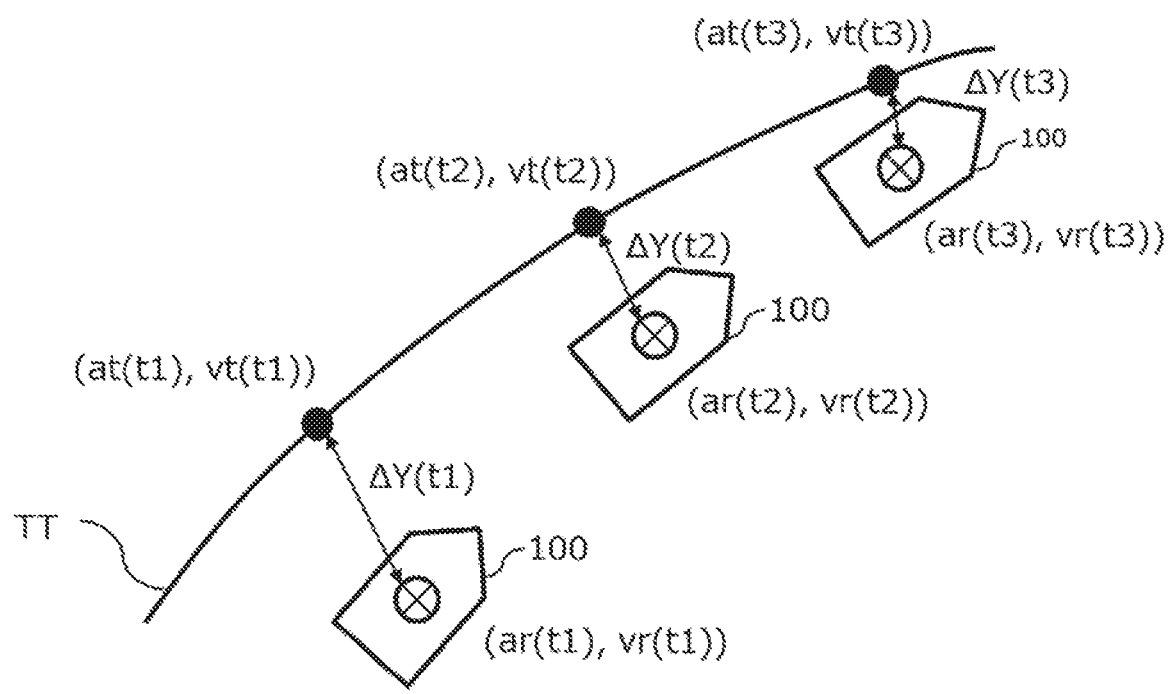
FIG. 2 is a diagram for explaining an outline of a track following control according to the embodiment in the present disclosure.

With reference to FIG. 2, an outline of the track following control of the present embodiment will be described. The control device 20 calculates a target track TT through which the vehicle 100 should pass from the current time to the future time. The target track TT is calculated based on the traveling path from the current position of the vehicle 100 to the destination of the vehicle 100 and the peripheral information of the vehicle 100 acquired by an external sensor such as the camera 12. The target track TT is represented by, for example, a coordinate system in which the traveling direction of the vehicle 100 is the X-axis and the width direction of the vehicle 100 is the Y-axis. The target track TT includes the target value of the control amount representing the motion state of the vehicle 100 for each predetermined timing. The target value of the control amount representing the motion state of the vehicle 100 includes target speed vt(t), the target acceleration at(t), the target steering angle of the vehicle 100, and the like. It should be noted that the timing t2 is one step later from the timing t1, and the timing t3 is one step later from the timing t2.

In track following control, the control device 20 calculates a deviation between the vehicle 100 and the target track TT. Deviations include lateral deviation (Y-direction deviation), yaw angle deviation (azimuth deviation), and speed and acceleration deviations. The control device 20 controls the vehicle actuators 30 such that the deviation between the vehicle 100 and the target track TT is reduced. FIG. 2 illustrates an example in which the control device 20, for each predetermined timing, sets the target speed vt(t) and the target acceleration at(t), and acquires the actual speed vr(t) and the actual acceleration ar(t). Further, the lateral deviation ΔY (t) is a lateral deviation of the vehicle 100 with respect to the target track TT at a predetermined timing t.

Figure 3:
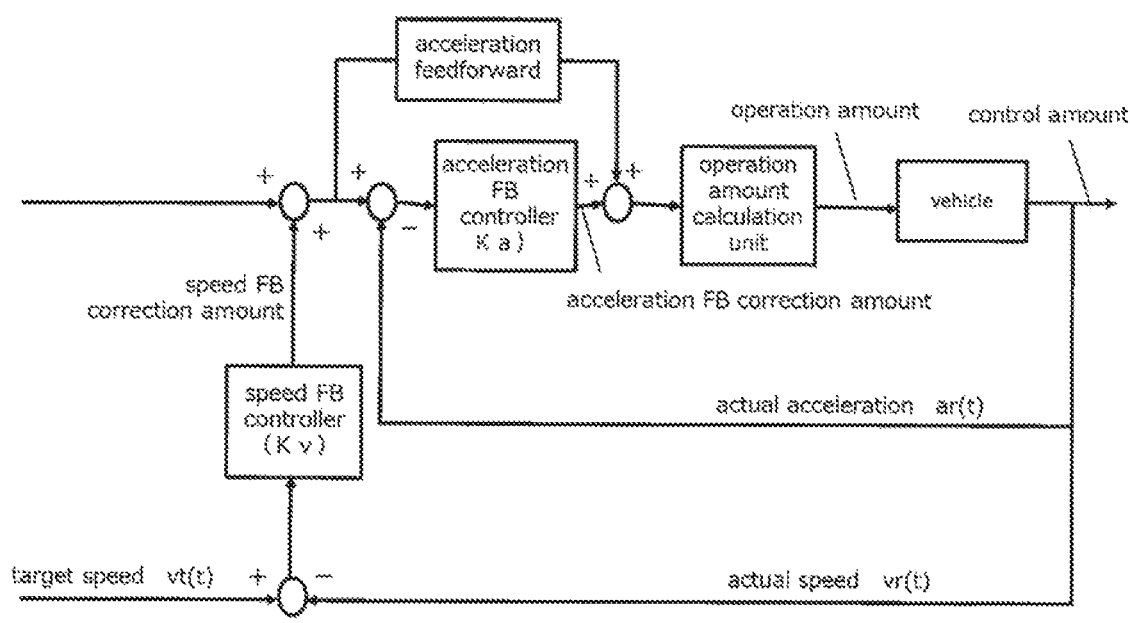
FIG. 3 is a block diagram of a speed-acceleration control system of the track following control according to the embodiment in the present disclosure.

FIG. 3 illustrates a block diagram of a speed-acceleration control system of the track following control in the embodiment of the present application. The speed-acceleration control system includes an acceleration feedforward system which calculates an operation amount of the vehicle 100 based on the target acceleration at(t) of the vehicle 100, a speed feedback system which feeds back the actual speed vr(t) of the vehicle 100, and an acceleration feedback system that feeds back the actual acceleration ar(t) of the vehicle 100. Using this speed-acceleration control system, the control device 20 executes track following control for the target track TT. The description of the steering angle control system (that is, the steering angle feedforward system and the steering angle feedback system) of the vehicle 100 will be omitted. Further, although, in the present embodiment, the target speed vt(t) and the target acceleration at(t) are calculated separately, the control device 20 may calculate the target acceleration at(t) by differentiating the target speed vt(t). Also, the control device 20 may calculate the target speed vt(t) by integrating the target acceleration at(t).

In the acceleration feedforward system, the control device 20 calculates the operation amount of the vehicle 100 based on the target acceleration at(t). That is, the control device 20 calculates, in the operation amount calculation unit, the required driving force for the drive actuator 31 and the required braking force for the brake actuator 32 which are necessary to realize the target acceleration at(t).

In the acceleration feedback system, the control device 20 acquires the actual value (actual acceleration) ar(t) of the acceleration, which is one of the control amounts of the vehicle 100, from the acceleration sensor 11, and feeds back the actual acceleration ar(t) to the acceleration feedforward system. Specifically, the control device 20 calculates the deviation between the target acceleration at(t) and the actual acceleration ar(t), and calculates the acceleration FB correction amount corresponding to the deviation by the acceleration FB controller. And then, the control device 20 adds the acceleration FB correction amount to the target acceleration at(t). The acceleration FB controller includes an acceleration feedback gain Ka for the deviation of the target acceleration at(t) and the actual acceleration ar(t) of the vehicle 100.

In the speed feedback system, the control device 20 obtains the actual value of the speed (i.e., actual speed) vr(t), which is one of the control amounts of the vehicle 100, from the speed sensor 10, and feeds back the actual speed vr(t) to the acceleration feedforward system. Specifically, the control device 20 calculates the deviation between the target speed vt(t) and the actual speed vr(t), and calculates the speed FB correction amount corresponding to the deviation is calculated by the speed FB controller. And then, the control device 20 adds the speed FB correction amount to the target acceleration at(t). The speed FB controller includes a speed feedback gain Kv for the deviation between the target speed vt(t) and the actual speed vr(t) of the vehicle 100.

A known feedback control such as P control, PI control, PID control, state feedback control or the like is applicable to the feedback control by the acceleration feedback system. A known feedback control such as P control, PI control, PID control, state feedback control or the like is applicable to the feedback control by the speed feedback system. The feedback control system of example in the present disclosure is not limited to FIG. 3. The feedback control system may calculate the operation amount based on external disturbances or internal state of each controller relating to the feedback control system.

Next, an outline of the stop-control performed in the track following control of the present embodiment. The control device 20, based on the camera information acquired from the camera 12, obtains a target stop position and the current position of the vehicle 100. The target stop position of the vehicle 100 is, for example, a position at which the vehicle 100 is to be parked. If the stop control is used in the application of parking to a predetermined position, the stop control is referred to in particular as a parking control.

When acquiring the target stop position of the vehicle 100 and the current position of the vehicle 100 from the camera information, the target stop position is acquired as a relative coordinate (relative position) with respect to the current position on the captured image data. The target stop position and the current position may be acquired by appropriately converting the relative coordinates on the captured image data into a coordinate system of the vehicle 100 or the like. The control device 20 may acquire the target position in accordance with instruction from the user of the vehicle 100 via Human Machine Interface (HMI) of the vehicle 100. For example, when a bird's-eye image is displayed on a touch panel display or the like provided in the vehicle 100, the control device 20 may acquire a position designated by the user on the displayed bird's-eye image as the target stop position of the vehicle 100. The control device 20, based on the acquired target stop position and the current position of the vehicle 100, calculates the target track from the current position to the target stop position.

Figure 4:
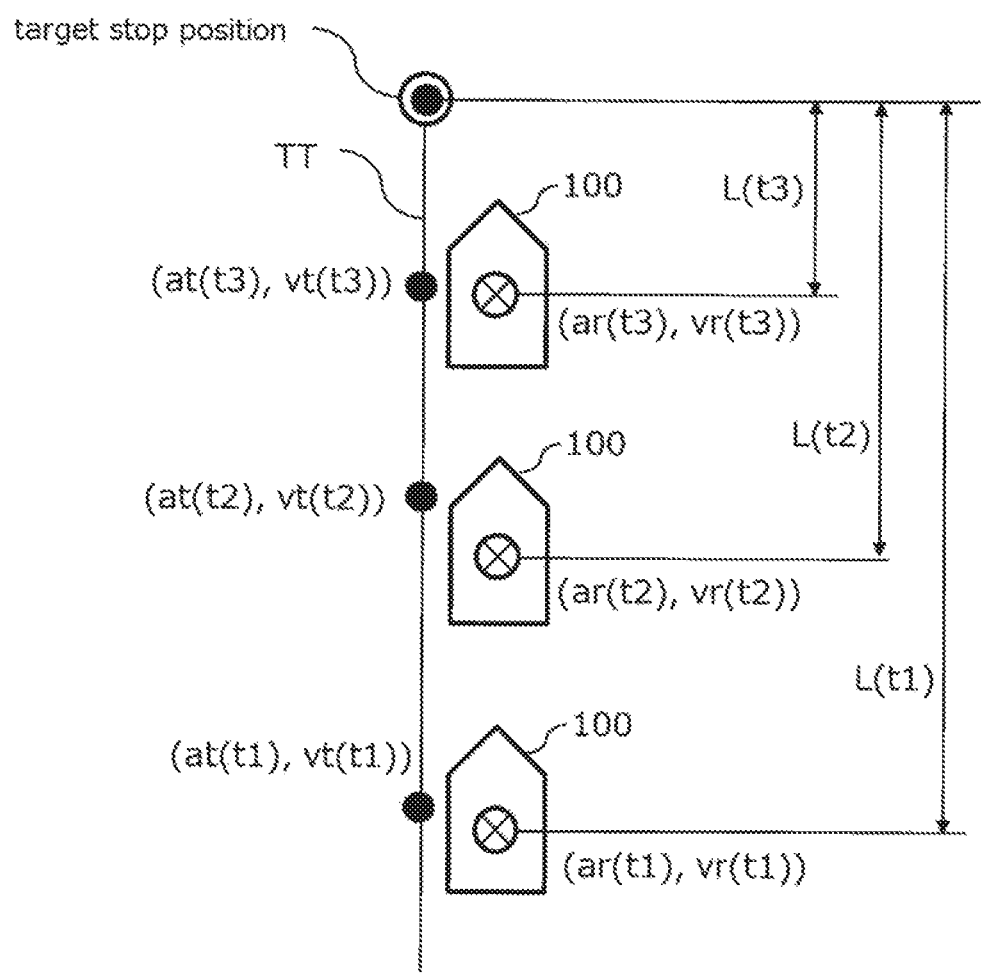
FIG. 4 is a diagram illustrating a stop control implemented in the track following control according to the embodiment in the present disclosure.

The stop control performed in the track following control of the present embodiment will be specifically described with reference to FIG. 4. FIG. 4 illustrates the target track TT to the target stop position of the vehicle 100. The control device 20, based on the captured image data transmitted from the camera 12 to the control device 20, sequentially calculates remaining distance L(t) from the current position of the vehicle 100 to the target stop position for each predetermined timing. The control device 20, the target acceleration at(t) at the timing t and the target speed vt(t) at the timing t set as target values of the speed-acceleration control system. The acceleration ar(t) and the speed vr(t) are the actual values obtained by the acceleration sensor 11 and the speed sensor 10 at the timing t, respectively. In the case of the example shown in FIG. 4, the control device 20 sets the target values of the speed-acceleration control system, and acquires the remaining distance L(t). The timing t2 is one step later from the timing t1, and the timing t3 is one step later from the timing t2.

The control device 20 may acquire the remaining distance L(t) based on movement amount of the vehicle 100. For example, if the remaining distance L(t1) from the current position of the vehicle 100 at the timing t1 to the target stop position is stored, the remaining distance L(t) at each timing t may be acquired by subtracting the movement amount of the vehicle 100 accumulated from the timing t1 from the remaining distance L(t1). The control device 20 may acquire the movement amount of the vehicle 100 based on the actual speed vr(t) acquired from the speed sensor 10 and the actual steering angle of the vehicle 100 acquired from the steering angle sensor 14.

Figure 5:
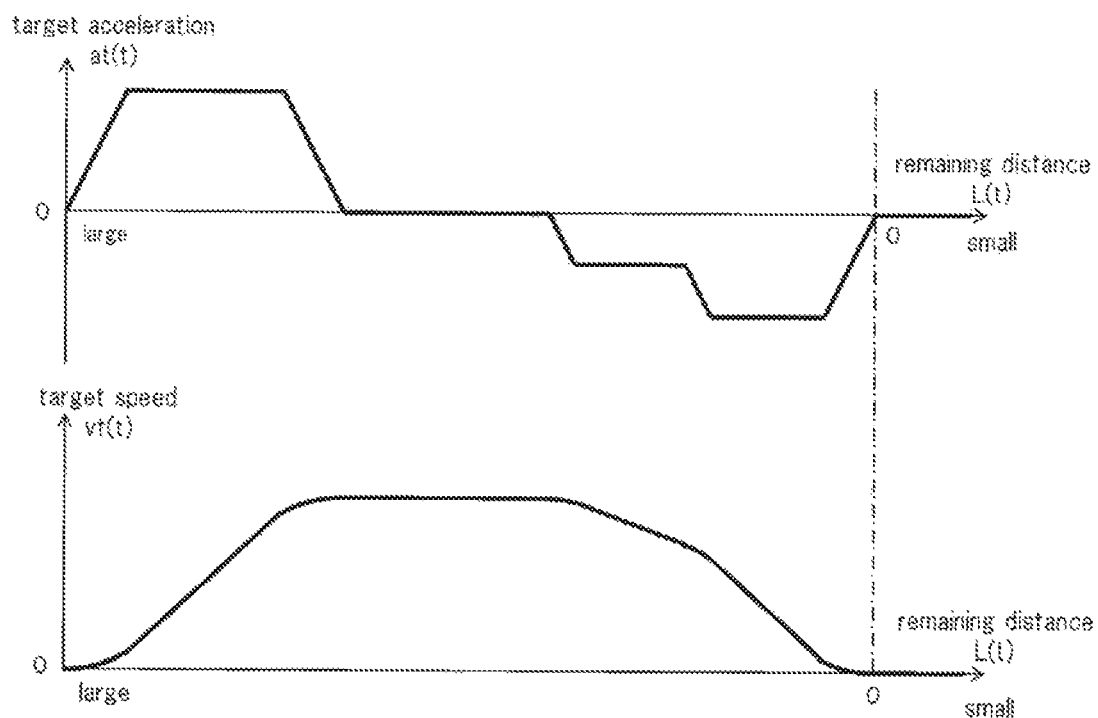
FIG. 5 Is a diagram illustrating an example of a target value used in the stop control of the embodiment in the present disclosure.

FIG. 5 illustrates an example of the target values used in the stop control according to the embodiment in the present disclosure. In the stop control, the target acceleration at(t) and the target speed vt(t) are set such that the vehicle 100 smoothly stops at the target stop position without sudden feeling. In the example shown in FIG. 5, the target acceleration at(t) and the target speed vt(t) are set according to the remaining distance L(t) to the target stop position. In this case, the control device 20 calculates the target track TT for each discrete value of the remaining distance L(t), and sets the target acceleration at(t) and the target speed vt(t) according to the remaining distance L(t).

In the stop control, accuracy of arrival at the target stop position of the vehicle 100 is required. For example, in an environment where an obstacle or the like is present in the vicinity of the vehicle 100, when applying the stop control of the present embodiment for the parking control to stop the vehicle 100 in front of the obstacle or the like, allowable error between actually stop position of the vehicle 100 and the target stop position is about 10 cm. As a method for improving the accuracy of arrival at the target stop position of the vehicle 100, it is conceivable to increase the feedback gain of the feedback control system in the track following control. Specifically, it is conceivable to increase at least one of the speed feedback gain Kv and the acceleration feedback gain Ka. However, when simply setting the feedback gain large, the speed of the vehicle 100 vibrates at a high frequency. Therefore, there is a possibility that riding comfort is deteriorated. If put a priority on the riding comfort and the feedback gain is set small, there is a possibility that than vehicle does not accurately stop to the target stop position.

Figure 6:
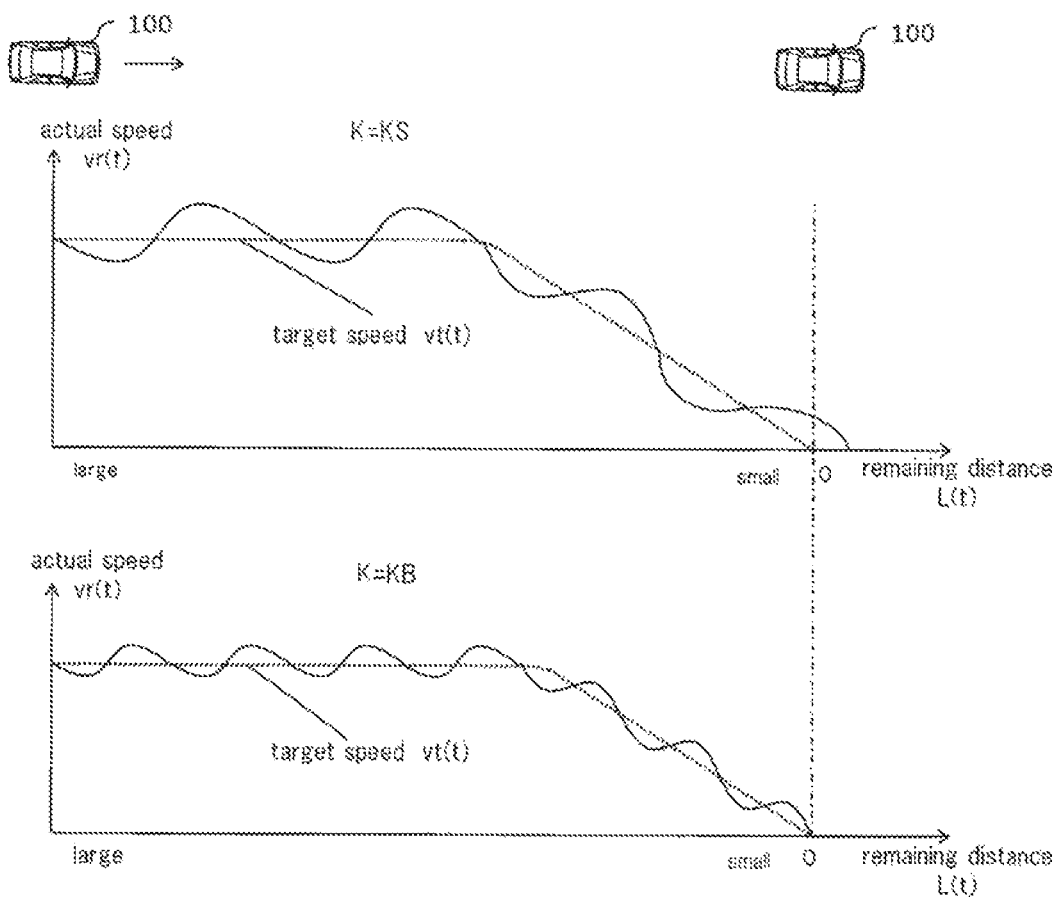
FIG. 6 is a diagram illustrating the relationship, according to the embodiment in the present disclosure, between magnitude of a feedback gain in the speed-acceleration control system, vibration of the speed of the vehicle, and accuracy of arrival at the target stop position.

FIG. 6 is a diagram illustrating the relationship between the magnitude of the feedback gain in the speed-acceleration control system according to the embodiment, the vibration of the speed of the vehicle 100 the magnitude, and the accuracy of arrival at the target stop position. The upper graph illustrates a case where the feedback gain K is set to a relatively small value KS, and the lower graph illustrates a case where the feedback gain K is set to a relatively large value KB (KS<KB). Each graph illustrates the relationship between the target speed vt(t) associated with the target track TT, the remaining distance L(t), and the actual speed vr(t) of the vehicle 100. The broken line indicates the target speed vt(t), and the solid line indicates the actual speed vr(t) of the vehicle 100. The one-dot chain line indicates the target stop position, i.e. the position of the remaining distance L(t)=0.

As shown in the graph of the upper stage of FIG. 6, when the feedback gain K is set to KS, it is a low frequency even if vibration occur in the speed of the vehicle 100. Therefore, the effect of the frequency on the riding comfort is relatively small. However, since the trackability to the target speed vt(t) of the actual speed yr (t) is reduced, the accuracy of arrival at the target stop position might be reduced. That is, the stop position of the vehicle 100 possibly exceed the target stop position, or the vehicle 100 possibly does not reach the target stop position.

As shown in the graph of the lower stage of FIG. 6, when the feedback gain K is set to KB, the accuracy of arrival at the target stop position is improved. However, since the actual speed vr(t) with respect to the target speed vt(t) vibrates at a high frequency, the riding comfort is possibly deteriorated. Therefore, in the driving support apparatus according to the present embodiment includes the following configuration for achieving both the riding comfort and the accuracy of arrival at the target stop position.

Figure 7:
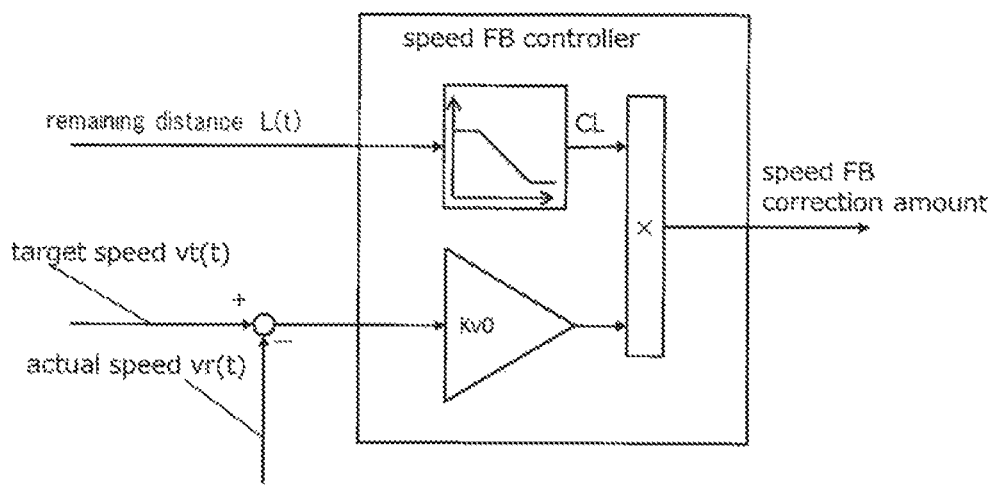
FIG. 7 Is a diagram illustrating an example of a configuration of a speed FB controller of the speed-acceleration control system according to the embodiment in the present disclosure.

FIG. 7 is a diagram illustrating an example of a configuration of a speed FB controller of the speed-acceleration control system of the present embodiment. In this example, the speed FB controller is configured as a proportional controller. The speed FB controller calculates the speed FB correction amount by multiplying the deviation between the target speed vt(t) and the actual speed vr(t) by the speed feedback gain Kv0 and the correction coefficient CL defined as a function of the remaining distance L(t). The speed feedback gain Kv0 multiplied by the correction coefficient CL is defined as the speed feedback gain Kv of the speed feedback system. With such a definition, the speed feedback gain Kv is expressed as a function of the remaining distance L(t).

Figure 8:
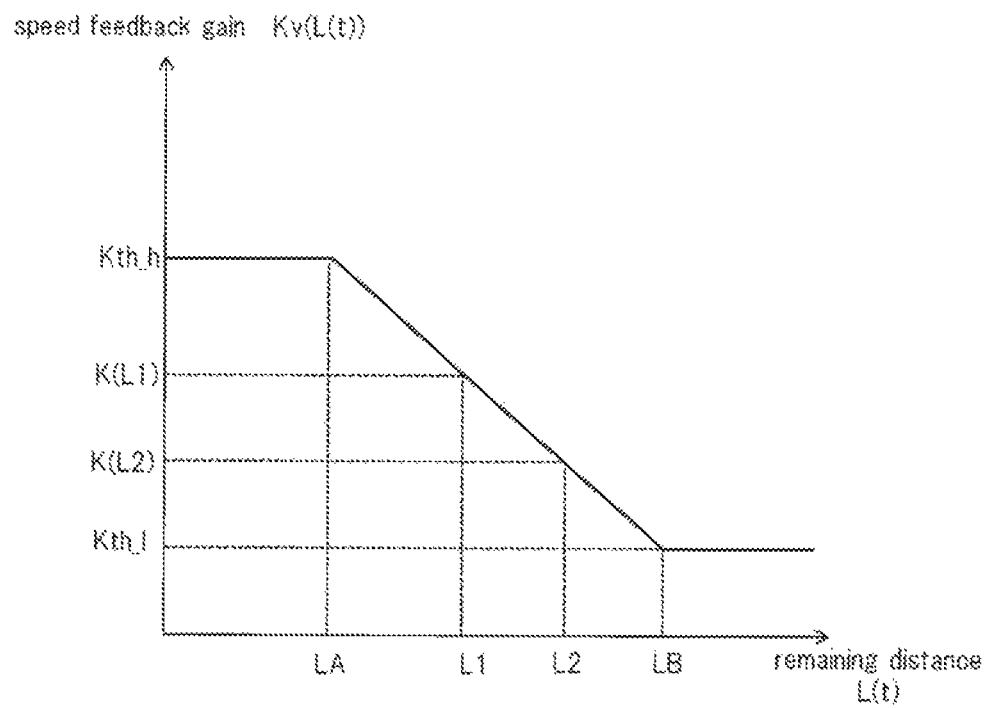
FIG. 8 is a diagram illustrating an example of the relationship between a speed feedback gain Kv and remaining distance L(t) according to the embodiment in the present disclosure.

FIG. 8 is a diagram illustrating an example of the relationship between the speed feedback gain Kv and the remaining distance L(t) in the present embodiment. In the case of the example illustrated in FIG. 8, in accordance with the distance section of the remaining distance L(t), i.e., the defined region of the speed feedback gain Kv(L(t)), the speed feedback gain Kv(L(t)) is expressed by the following equation (1) to equation (3). However, the feedback gain Kth_h is larger than the feedback gain Kth_1. Further, the feedback gain Kth_1 is a normal track following control, i.e., the speed feedback gain used in the track following control when the stop control is not performed. The distance section of the remaining distance L(t) in the equations (1) to (3) may be either a closed section or an open section.

$$K(L(t)) = \text{Kth\_h} \ \{L(t) \mid [0, LA]\} \qquad \text{[Equation (1)]}$$

$$K(L(t)) = \left(L(t) - \frac{(LA + LB)}{2}\right)\frac{Kth_l - Kth_h}{LB - LA} + \frac{Kth_l + Kth_h}{2} \ \{L(t) \mid [LA, LB]\} \qquad \text{[Equation (2)]}$$

$$K(L(t)) = \text{Kth\_l} \ \{L(t) \mid [Lb, \infty]\} \qquad \text{[Equation (3)]}$$

Incidentally, for the equation (2), the speed feedback gain Kv(L(t)) does not necessarily linearly change. It is sufficient that the speed feedback gain Kv(L(t)) monotonically increase as the remaining distance L(t) decreases.

As shown in FIG. 8 and the expressions (1) to (3), in the driving support apparatus according to the present embodiment, the control device 20 sets, the speed feedback gain Kv(L(t)) when the remaining distance L(t) is relatively small (L(t)) is larger than the speed feedback gain Kv(L(t)) when the residual distance L(t) is relatively large. This feature corresponds to the feature of claim 1. Further, as shown in FIG. 8 and expression (2), the control device 20, within the distance section[LA, LB], sets the speed feedback gain Kv(L(t)) so as to monotonically increase as the remaining distance L(t) decreases. This feature corresponds to the feature of claim 2. Further, as shown in FIG. 8 and expression (1), the control device 20, within the distance section[0, LA], fixes the speed feedback gain Kv(L(t)) to the upper limit value Kth h. This feature corresponds to the feature of claim 3.

Figure 9:
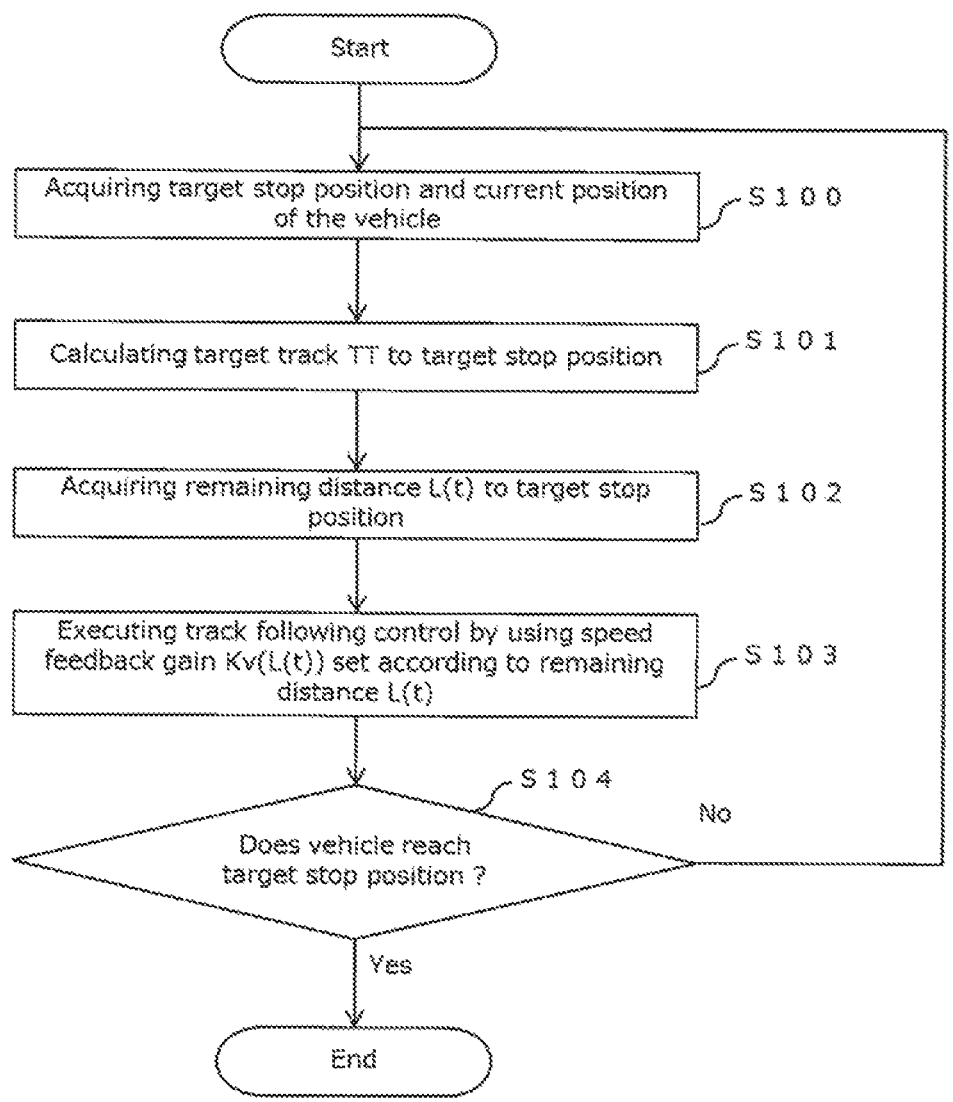
FIG. 9 is a flowchart illustrating a series of processes in the stop control executed by the control device according to the embodiment in the present disclosure.

FIG. 9 is a flowchart illustrating a series of processes in stop control which the control device 20 executes in the track following control.

In S100, the control device 20, based on the camera information acquired from the camera 12, acquires the target stop position and the current position of the vehicle 100. When acquiring the target stop position of the vehicle 100 and the current position of the vehicle 100 from the camera information, the target stop position is acquired as a relative coordinate with respect to the current position on the captured image data. The target stop position and the current position may be acquired by appropriately converting the relative coordinates on the captured image data into a coordinate system of the vehicle 100 or the like.

In S101, the control device 20 calculates, based on the target stop position of the vehicle 100 and the current position of the vehicle 100, the target track TT from the current position to the target stop position. The target track TT includes a target speed vt(t) and the target acceleration at(t) of the vehicle 100 for each predetermined timing t.

In S102, the control device 20 acquires, based on the captured image data acquired from the camera 12, the remaining distance L(t) from the current position of the vehicle 100 to the target stop position, sequentially acquired for each predetermined timing.

In S103, the control device 20, using the speed feedback gain Kv(L(t)) set according to the remaining distance L(t), executes the track following control for the target track TT.

In S104, if the vehicle 100 reaches the target stop position of the vehicle 100, i.e., if the remaining distance L(t) becomes 0 (That is, S104 is Yes), the control device 20 terminates the track following control for the target track TT. On the other hand, if the the vehicle 100 does not reached the target stop position of the vehicle 100 (That is, S104 is No), the process by the control device 20 returns to S100.

By executing a series of processes of S104 from S100, the control device 20 brings the vehicle 100 close to the target stop position. At that time, when the remaining distance L(t) to the target stop position is relatively large, i.e., when the remaining distance L(t) is a second distance, the control device 20 sets the speed feedback gain Kv (L (t)) to the relatively small value. Thereby, the vibration at high frequencies of the vehicle speed is suppressed so that the deterioration of riding comfort is suppressed. When the remaining distance L(t) becomes relatively small, i.e., when the remaining distance L(t) is the first distance, the control device 20 sets the speed feedback gain Kv(L(t)) to the relatively large value to increase the accuracy of arrival at the target stop position of the vehicle 100.

As described above, according to the driving support apparatus according to the present embodiment, it is possible to achieve both the accuracy of arrival at the target stop position and the riding comfort. The speed feedback gain Kv is monotonically increased as the remaining distance L(t) decreases. Thereby, it is possible to gradually increase the accuracy of arrival at the target stop position while suppressing excessive deterioration of the riding comfort. Further, by providing the upper limit value to the speed feedback gain Kv, it is possible to suppress excessive deterioration of the riding comfort.

Hereinafter, a modification of the driving support apparatus according to the present embodiment will be exemplified.

(a) Although the parking control has been described as an example of the stop control performed by the track following control in the above embodiment, the track following control may be applied to uses other than parking. For example, the track following control can be applied to the following uses;

for stopping the vehicle 100 at a predetermined position in front of the traffic signal (e.g., stop line);

for stopping the vehicle 100 at a bus stop when the vehicle 100 is a route bus; or for stopping the vehicle 100 in front of a passenger when the vehicle 100 is a taxi.

(b) In the above embodiment, as an example in which the target stop position of the vehicle 100 is acquired based on the user instruction, the example in which a touch panel display is used is described. However, the target stop position of the vehicle 100 may be acquired based on an input from any other HMI or an information terminal, or an instruction from an external device. For example, the target stop position may be acquired based on a voice input or a hardware switch. Further, the control device 20 may acquire the current position of the vehicle 100 based on the information transmitted from the external device or GPS information.

(c) In the above embodiment, the speed feedback gain Kv is variable according to the remaining distance L(t). However, instead of the speed feedback gain Kv, the acceleration feedback gain Ka may be variable according to the remaining distance L(t). Alternatively, both the speed feedback gain Kv and the acceleration feedback gain Ka may be variable according to the remaining distance L(t). Although the feedback control in the above embodiment is P-control, if the feedback control includes D-control, the feedback gain of the D-control may also be variable according to the remaining distance L(t). If the feedback control includes I-control, the feedback gain of the I-control may also be variable according to the remaining distance L(t). However, What means that the feedback gain is variable according to the remaining distance L(t) is that the feedback gain is set to a large value when the remaining distance L(t) to the target stop position is the first distance, compared with the case when the remaining distance L(t) is the second distance larger than the first distance.

What is claimed is:

1. A driving support apparatus comprising:
a feedback control system, including a processor, configured to:
calculate each operation amount of a brake actuator and a drive actuator so as to match an actual value of a control amount indicating a motion state of a vehicle to a target value, and
set the target value of the control amount so as to stop the vehicle at a target stop position, wherein
when a remaining distance from a current position of the vehicle to the target stop position is a first distance, increase a feedback gain as compared with the feedback gain used when the remaining distance is a second distance which is greater than the first distance, and wherein
an upper limit value is set for the feedback gain, and
the feedback gain is fixed to the upper limit value when the remaining distance is within a reference distance smaller than the first distance.

2. The driving support apparatus according to claim 1, wherein the feedback gain monotonically increases as the remaining distance decreases.

3. The driving support apparatus according to claim 1, wherein
 the feedback control system comprises at least one of a speed feedback system that feeds back speed of the vehicle and an acceleration feedback system that feeds back acceleration of the vehicle; and
 the feedback gain includes at least one of a speed feedback gain for the speed feedback system and an acceleration feedback gain for the acceleration feedback system.

4. The driving support apparatus according to claim 1, wherein the feedback control system is further configured to:
 calculate a target track for the vehicle to pass from the current position to a future time based on a traveling path from the current position of the vehicle to a destination of the vehicle and peripheral information of the vehicle acquired by an external sensor, the target track including target value of the control amount representing the motion state of the vehicle for each predetermined timing, the target value including a target speed of the vehicle, a target acceleration, and a target steering angle,
 calculate deviation between the vehicle and the target track, the deviation including lateral deviation, yaw angle deviation, speed deviation and speed deviation; and
 calculate the remaining distance based on the peripheral information at the predetermined timing, or based on a movement amount of the vehicle, and wherein
 perform the feedback control of the speed, the acceleration and the steering angle of the vehicle so as to reduce the deviation, and wherein
 the feedback gain is increased as the remaining distance is increased.

* * * * *